March 12, 1957  J. ANDERSON ET AL  2,785,379
INDUCTION WATTHOUR METER FOR TWO AND THREE WIRE SERVICE
Filed Nov. 29, 1952  2 Sheets-Sheet 1
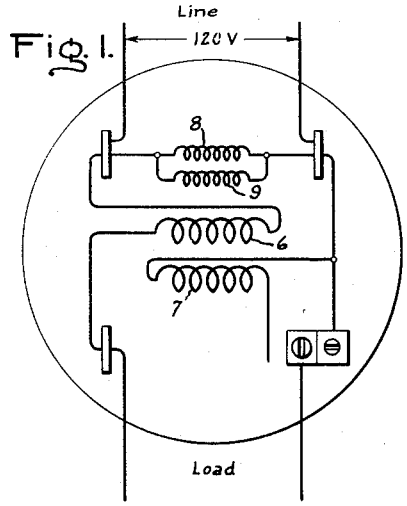
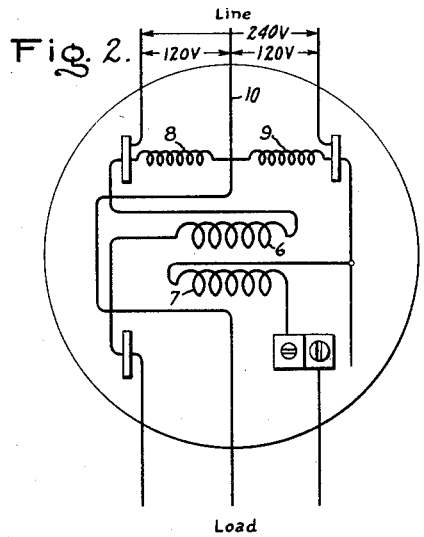
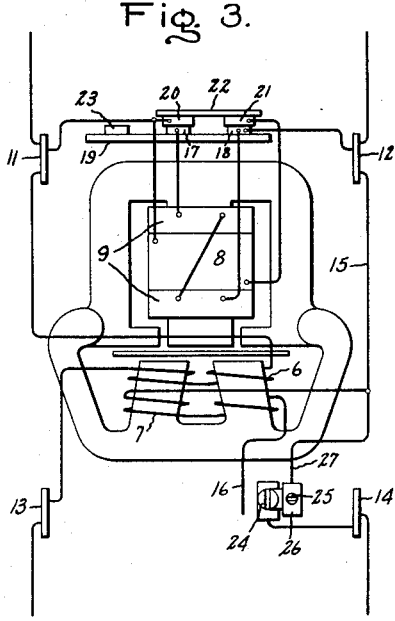
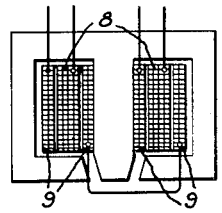
Inventors:
Jo Anderson,
Andrew S. Robinson,
by Russell A. Warner
Their Attorney.

March 12, 1957 J. ANDERSON ET AL 2,785,379
INDUCTION WATTHOUR METER FOR TWO AND THREE WIRE SERVICE
Filed Nov. 29, 1952 2 Sheets-Sheet 2

Inventors:
Jo Anderson,
Andrew S. Robinson,
by Russell A. W......
Their Attorney.

United States Patent Office 2,785,379
Patented Mar. 12, 1957

2,785,379

INDUCTION WATTHOUR METER FOR TWO AND THREE WIRE SERVICE

Jo Anderson, Swampscott, and Andrew S. Robinson, Medford, Mass., assignors to General Electric Company, a corporation of New York Application November 29, 1952, Serial No. 323,244

7 Claims. (Cl. 324—137)

Our invention relates to induction watthour meters adapted for measuring the load on two wire or three wire single phase circuits, and one object is to provide such a meter that when properly calibrated for measuring the load on a two wire circuit, it does not require recalibration for use on a three wire circuit and vice versa. Another object of our invention is to provide simple and convenient switching facilities whereby the meter may be quickly reconnected from a two wire circuit meter to a three wire circuit meter and vice versa without adding or removing any parts, such facilities also serving as a clear indication externally of the meter as to how connected.

Figure 4:
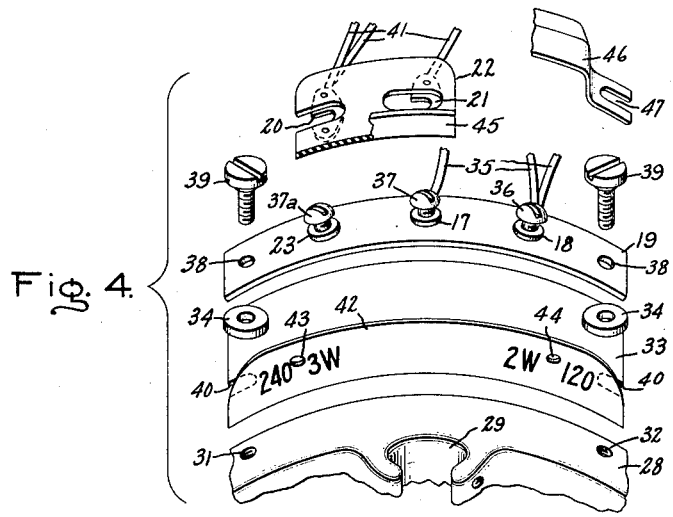
Figure 5:
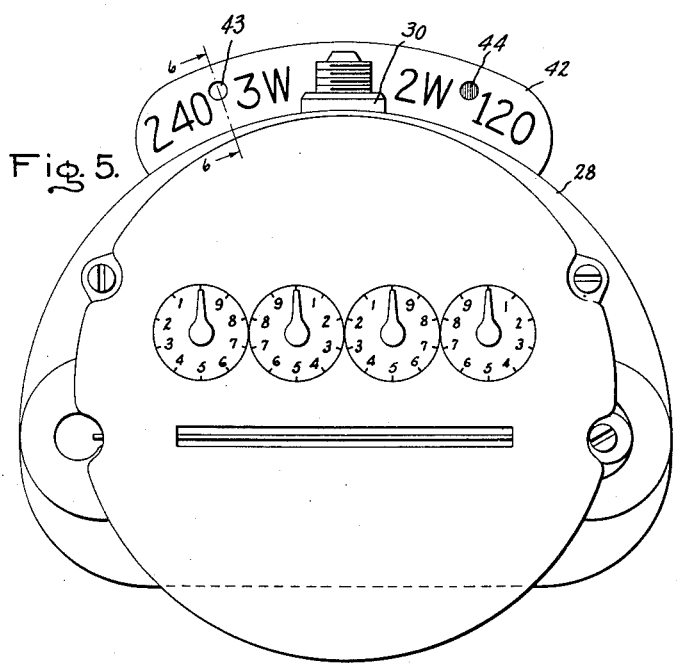
Figure 6:
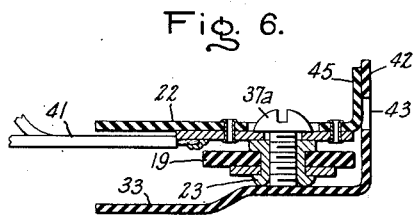

The features of our invention which are believed to be novel and patentable will be pointed out in the claims appended hereto. For a better understanding of our invention reference is made in the following description to the accompanying drawing in which Figs. 1 and 2 diagrammatically represent the circuit connections of our meter for two wire and three wire service, respectively. Fig. 3 shows the meter core structure and coil positions thereon and the general scheme of connections. Fig. 3a illustrates another voltage coil arrangement. Fig. 4 is an exploded view of the facilities for changing the voltage connections, and Fig. 5 is a face view of a meter with the cover removed illustrating the indicator for telling how the voltage leads of the meter are connected. Fig. 6 is a section taken on about line 6—6 of Fig. 5. Fig. 7 illustrates the current coil connector and how it indicates its connection.

In the distribution of electricity 240-volt, single phase, three wire service is often used to supply both 120- and 240-volt appliances and to provide for future load expansion. The third wire is a neutral wire with 120 volts between it and the other two wires. Some loads when initially connected do not justify more than 120-volt, two wire service but later require 240-volt, three wire service. Our invention concerns a watthour meter which may meter either type of service by a simple change in connections and without recalibration, and obviates the necessity of changing meters when a load is changed over from 120-volt, two wire service to 240-volt, three wire service or vice versa.

Our meter has two equal flux producing current windings 6 and 7 and two equal flux producing voltage windings 8 and 9. Each voltage winding is wound for 120 volts. In Figs. 1 and 2 the line and load wires leading to and from the meter are so marked. The voltage across the line in Fig. 1 is assumed to be 120 volts, and the voltage across the outside wires in Fig. 2 is assumed to be 240 volts with 120 volts between the neutral line wire 10 and the outside wires. For two wire service the voltage windings are connected in parallel across the line and only one current winding is used as represented in Fig. 1. For three wire service the voltage windings are connected in series across the 240-volt outside wires and both current windings are used, one being connected in each outside wire. The neutral wire is not used but may pass through the meter casing.

The meter windings are positioned on the meter laminated magnetic core as represented in Fig. 3. It is to be noted that turns of each current winding are on both legs of the U-shaped current core, and hence, whether one or both windings are used, the current flux is balanced between the two limbs of the current core. In the case of the connection for the three wire service, the current in the two windings 6 and 7 may be unbalanced. However, since equal portions of both windings are on each limb of the current core, the generation of current flux in both limbs is the same and balanced.

To avoid the necessity of recalibration when changing from one type of service to the other, it has been found necessary to distribute the two voltage windings on the potential core so as to obtain a symmetrical distribution of the potential flux and coil resistance reactance ratio for both connections. Thus, in Fig. 3 the voltage winding 9 is divided into two equal parts and placed on either axial side of the one portion voltage winding 8. When this is done the potential flux and coil resistance distribution of the meter is the same for either connection. The two parts of winding 9 may also be placed inside and outside of winding 8 as shown in cross section in Fig. 3a with the desired result, and it will of course be apparent that both windings may be wound together by using two wires side by side in the winding operation.

Fig. 3 also shows in general the switching means and scheme of connections, the connections being represented as for two wire service. 11 and 12 represent the meter line terminals, and 13 and 14 the meter load terminals of a plug-in type meter. It is noted that the upper current coil 6 is permanently connected in the line between terminals 11 and 13. Current coil 7 while connected at one end to a meter connector 15 between line terminal 12 and switch terminal 27 is open at its other end 16.

The terminals of voltage winding 9 are permanently connected to terminals 17 and 18 of a fixed terminal board 19 of insulating material. The terminals of voltage winding 8 are permanently connected to terminals 20 and 21 of a movable terminal clip 22 of insulating material. One line terminal 12 is permanently connected to terminal 18, and the other line terminal 11 is permanently connected to terminal 20. The spacing of terminals 17 and 18 on stationary board 19 is the same as the spacing of terminals 20 and 21 on terminal board 22. Hence, the movable clip or board 22 may be placed as shown and fastened in place to connect the voltage coils in parallel across the line.

To change the connections for three wire service, movable terminal board 22 is simply moved to the left until its terminal 21 contacts terminal 17. There is a third terminal 23 on the fixed terminal board 19 which serves no other purpose than to support terminal 20 and to fasten the movable terminal clip in place when placed for three wire service. When clip 22 is so placed, the voltage coils 8 and 9 will be connected in series across meter line terminals 11 and 12. It is noted that the parts just described comprise a form of two position switch.

Current coil 7 is also to be connected in the line between meter terminals 12 and 14 by loosening screws at 24 and 25 in a switch clip 26 so as to swing this clip around 180 degrees on screw 24 as a pivot, disconnecting it from the terminal wire 27 and connecting it to current coil terminal 16 as shown in Fig. 7. Both current coils are now properly connected for three wire service. This switching device is essentially a single pole, double throw switch where 16 and 27 are the stationary contacts and clip 26 the movable blade.

The details of a preferred form of switch arrangement for the voltage coils are shown in an exploded view in Fig. 4.

In Fig. 4 the parts of the voltage switch which in general correspond to those explained in connection with Fig. 3 are indicated by the same reference characters. This voltage coil switch is on the top part of the watthour meter frame indicated at 28 and the switch supporting parts are curved to conform with the curved upper surface of the meter frame. In Fig. 4 the opening at 29 in the meter frame is to accommodate the upper bearing 30 of the meter shown in Fig. 5. The potential terminal board switch arrangement is mounted to the rear of the bearing 30, and screw holes 31 and 32 are provided in the frame for that purpose.

Between the meter frame and fixed terminal board 19 there is a spacer strip 33 of insulating material. This in turn is spaced from the terminal board 19 by washers 34 of insulating material so as to leave room for the wires 35 leading to voltage winding 9 and which are connected to terminals 17 and 18 beneath board 19. The terminal board 19 is of course made of insulating material, and the conducting terminals 17, 18, and 23 are fastened thereto and extend therethrough from top to bottom and have threaded openings to accommodate screws 36, 37, and 37a. These terminals may be in the form of hollow threaded rivets as indicated in Fig. 6. The board 19 also has openings to accommodate the screws 39. When assembled, the screws 39 pass through openings 38, washers 34, slots 40 in spacer board 33 and are screwed tight into the threaded openings 31 and 32 in the meter frame. The movable clip 22 of the switch is of insulating material and has slotted terminals 20 and 21 beneath and riveted to the same and spaced the same as the spacing between terminals 17 and 18 and between 23 and 17. The necessary connecting wires 41 are permanently united to terminals 20 and 21 and connected as shown and explained in connection with Fig. 3.

For the two wire meter connection shown in Fig. 3, terminal 21 will be in contact with terminal 18, and terminal 20 will be in contact with terminal 17, and the screws 36 and 37 will be passed through the slotted openings in clip 22 and its terminals and will be screwed tight into terminals 17 and 18. The heads of these screws are larger than the slots in the terminals 20 and 21 but slightly smaller than the corresponding slots in the insulating clip 22 so that when screwed tight, a solid metal-to-metal fastening is made. (See Fig. 6.) To change the voltage connections for three wire service, the screws in terminals 17 and 18 will be loosened. Clip 22 will then be slipped slightly to the right clearing the screws in terminals 17 and 18, moved to the left, and its slotted terminals slipped to the left over the screws in terminals 17 and 23. The screws 37 and 37a will now be tightened and the potential switching operation is complete. It is to be noted that no screws or parts are completely removed or added in changing from two wire to three wire meter connections or vice versa, and the only tool needed is a screw driver.

Preferably, a light cover 46 of insulating material is provided for covering the clip 22 and switch terminals. The cover has slots 47 at its ends to slip under the heads of screws 39 to retain this cover in place. The cover 40 is sufficiently flexible so that the screws 39 do not need to be removed for removing or replacing the cover.

It will be noted that the forward edge 42 of the insulating spacer member 33 is turned upwards at right angles and is marked opposite an opening 43 with the inscription "240 3W" representing 240 volts 3 wire, and opposite an opening 44 with the inscription "2W 120" representing 2 wire 120 volts. Also the forward edge 45 of insulated terminal clip 22 is turned up at right angles. When the parts are assembled for three wire meter operation, the front vertical surface of 45 fits against the back vertical surface of 42 as shown in Fig. 6. The front vertical surface of 45 is preferably painted white or some color contrasting with the black or dark color of the front surface of 42. Hence, 45 is clearly visible through the opening 43 and gives an indication that the potential switch is connected for 240 volts 3 wire meter operation. At this time opening 44 is uncovered but appears dark because here one is looking into the shadowed interior of the meter towards the inside back wall of the meter casing.

When the switch clip 22 is moved to the two wire meter connecting position (Fig. 3), the white marking of 22 shows in opening 44 and opening 43 appears dark, thus indicating that the switch is in the 2 wire 120-volt meter connecting position. Such indication is clearly seen through the upper portion of the customary transparent glass cover of the meter, a portion of which cover is shown at 48 in Fig. 7.

Likewise the connected position of the current coil changing switch 26 is marked as shown in Fig. 7 by the markings "240-3W" and "120-2W," and can be seen through the glass meter cover 48 by looking slightly upward from below the meter as it is customarily mounted. It should be further noted that the current switch can be locked in a completely open mid position and thus used temporarily as a service disconnecting switch on a two wire circuit.

It is now seen that one needs only this one meter for either of the services described, and that in changing from one service to the other the meter does not need to be recalibrated; also that the only tool required is a screw driver. No screws need to be removed but only loosened and tightened. In fact such screws may have their ends upset so as to discourage or prevent their complete removal. This is desirable because such small screws may be easily dropped if removed, and in which case they may drop into the meter and cause meter error or damage if not gotten out. A loose magnetic screw is easily attracted by flux from the meter drag magnets, and to get it out may necessitate the removal and disassembly of the meter.

The change from one service to the other is very simple, but does require that the glass cover be removed. The way the meter is connected is readily visible with or without removing the glass cover.

It is also to be noted that the contact engaging screws such as 36, 37, and 37a, of the voltage switch and 24, 25, and 26, of the current switch serve to lock its switch in whatever position it may be in with the then cooperating pairs of contacts in firm engagement when the screws are tightened. Thus the switches serve as such so that the meter connections may be readily changed without the removal or adding of connecting links, wires, screws, bolts, and the like, but the contact engaging screws serve to lock the switches in their respective positions, so they cannot move accidentally due to vibration, etc. The switch contacts serve the double purpose of switch contacts and screw secured terminal connectors.

What we claim as new and desire to secure by Letters Patent of the United States is:

1. An induction watthour meter for measuring the load on two wire and three wire single phase circuits, said meter having a pair of line terminals and a pair of load terminals, a voltage magnetic circuit having two equal flux producing potential windings, a current magnetic circuit having two equal flux producing current windings, a two position, four contact voltage switch in said meter serving in one position to connect said voltage windings in parallel, and in the other position to connect said voltage windings in series, across the line terminals, said meter having the necessary permanent connections between said switch contacts, meter line terminals and said voltage windings for this purpose, one current winding being permanently connected between one meter line terminal and one meter load terminal and a single pole double throw current switch in said meter having first and second positions, the first position connecting the other current winding between the other line and load terminals and the second position interrupting the last-mentioned connection and completing a connection between said other line and load terminals, said switches being provided with contact engaging screws which when loosened permit changing the switch positions and which may be tightened to lock the switches in their different positions with their contacts firmly engaged.

2. An induction watthour meter for measuring the load on two wire and three wire single phase circuits, said meter having a pair of line terminals and a pair of load terminals, a voltage magnetic circuit having two equal flux producing voltage windings, a two position, four contact switch in said meter, two of said switch contacts having permanent connections to meter line terminals and voltage windings and the other two contacts having permanent connections only to voltage windings, said switch serving when in one position to connect said windings in parallel, and in the other position to connect said windings in series, across said line terminals, said windings being positioned on said voltage magnetic circuit to produce the same potential flux and coil resistance reactance ratio distribution for both connections, a U-shaped current core, a pair of equal flux producing current windings, equal portions of each current winding being wound on each limb of said U-shaped core, one of said current windings being permanently connected between one meter line terminal and one meter load terminal, and a single pole, double throw current switch in said meter having first and second positions, the first position connecting the other current winding between the other line and load meter terminals, and the second position opening the last-mentioned current winding connection and completing a connection between said other line and load terminals.

3. A glass cover induction watthour meter for measuring the load on two wire and three wire single phase circuits, said meter having a pair of line terminals and a pair of load terminals, two equal flux producing voltage windings and two equal flux producing current windings, a two position voltage switch in said meter having permanent connections to the meter load terminals and to the voltage windings, which switch when in one position connects said voltage windings in parallel, and when in the other position connects said voltage windings in series, across said line terminals for two wire and three wire meter operations respectively, one of said current windings being permanently connected in series between one line terminal and one load terminal, a single pole, double throw, current switch in said meter having first and second positions and which, when in the first position, completes a circuit from the other line terminal through the other current winding to the other load terminal for three wire meter operation and when in the second position interrupts said last-mentioned circuit and completes a circuit directly between said other line and load terminals for two wire meter operation, and markings in said meter adjacent said switches indicating the positions of said switches in terms of their two wire and three wire meter connections, said markings and indications being clearly visible from the outside of said meter through the glass cover thereof.

4. A glass cover induction watthour meter for measuring the load on two wire and three wire single phase circuits having a pair of line terminals, a pair of load terminals, a two winding voltage electromagnet, a two winding current electromagnet, a voltage switch connected between the meter load terminals and voltage windings for connecting the voltage electromagnet windings in parallel or series between the line terminals, permanent connections for connecting one current winding in series between one line and one load terminal and a current switch with connections to the other current winding, line terminal and load terminal for connecting said other current winding in circuit between said other line and load terminals or disconnecting said second current winding and connecting said other line and load terminals together, the voltage and current electromagnets being designed so that their windings will give equal flux producing results, said switches having screw operated contact clamping means for locking said switches in either of their operating positions when the screws are tight and permit their operation when the screws are loosened, whereby the meter connections may be changed and made secure with the aid of a screw driver without adding or removing circuit connecting or securing parts, and means within said meter operated by said switches for visually indicating from the outside of said meter how the meter is connected.

5. The combination defined by claim 1 wherein said voltage switch comprises first and second fixed contacts and first and second movable contacts; said permanent connections for said voltage switch including means connecting one of said potential windings across said fixed contacts, means connecting the other of said potential windings across said movable contacts, means connecting one line terminal to said first movable contact, and means connecting the other line terminal to said second fixed contact; means for slidably mounting said movable contacts to establish two positions for said voltage switch, one of said positions having corresponding movable terminals making contact with corresponding fixed terminals for connecting said potential windings in parallel for two-wire service, and the other of said positions having said second movable contact making contact with said first fixed contact for connecting said potential windings in series for three-wire service.

6. The combination defined by claim 5 wherein said current switch includes first and second fixed contacts corresponding to said first and second switch positions and a movable contact adapted to selectively engage said first and second fixed contacts, said first contact comprising one extremity of a substantially stiff conducting lead having its other extremity connected to said other meter line terminal, said second contact comprising one extremity of a substantially stiff conducting lead spaced from said one extremity of said first lead and having its other extremity connected to said other current winding, said movable contact being connected to said other meter load terminal and comprising a terminal body mounted to selectively pivot about an axis lying between said spaced lead extremities, said body having a lead receiving aperture therein and a terminal screw for clamping said lead in place.

7. The combination defined by claim 6 wherein said meter has a glass cover and said voltage and current switches have two-wire and three-wire indicating markings adjacent thereto, said movable contacts of said voltage switch having a part thereof which cooperates with its associated indicating markings to show how the potential windings are connected, said movable terminal body of said current switch cooperating with its associated indicating markings to show how the current windings are connected, said switches and said markings being so placed within the meter that the indications are clearly visible through said glass cover from the outside thereof.

References Cited in the file of this patent

UNITED STATES PATENTS

| | | |
|---|---|---|
| 1,965,329 | Abbott | July 3, 1934 |
| 2,167,649 | Green | Aug. 1, 1939 |
| 2,183,617 | Kurz | Dec. 19, 1939 |
| 2,390,811 | Petzinger | Dec. 11, 1945 |

FOREIGN PATENTS

| | | |
|---|---|---|
| 405,055 | Great Britain | Feb. 1, 1934 |